Feb. 22, 1966  E. P. WHITLOW  3,236,064
ABSORPTION REFRIGERATION SYSTEM
Filed May 26, 1964  2 Sheets-Sheet 1
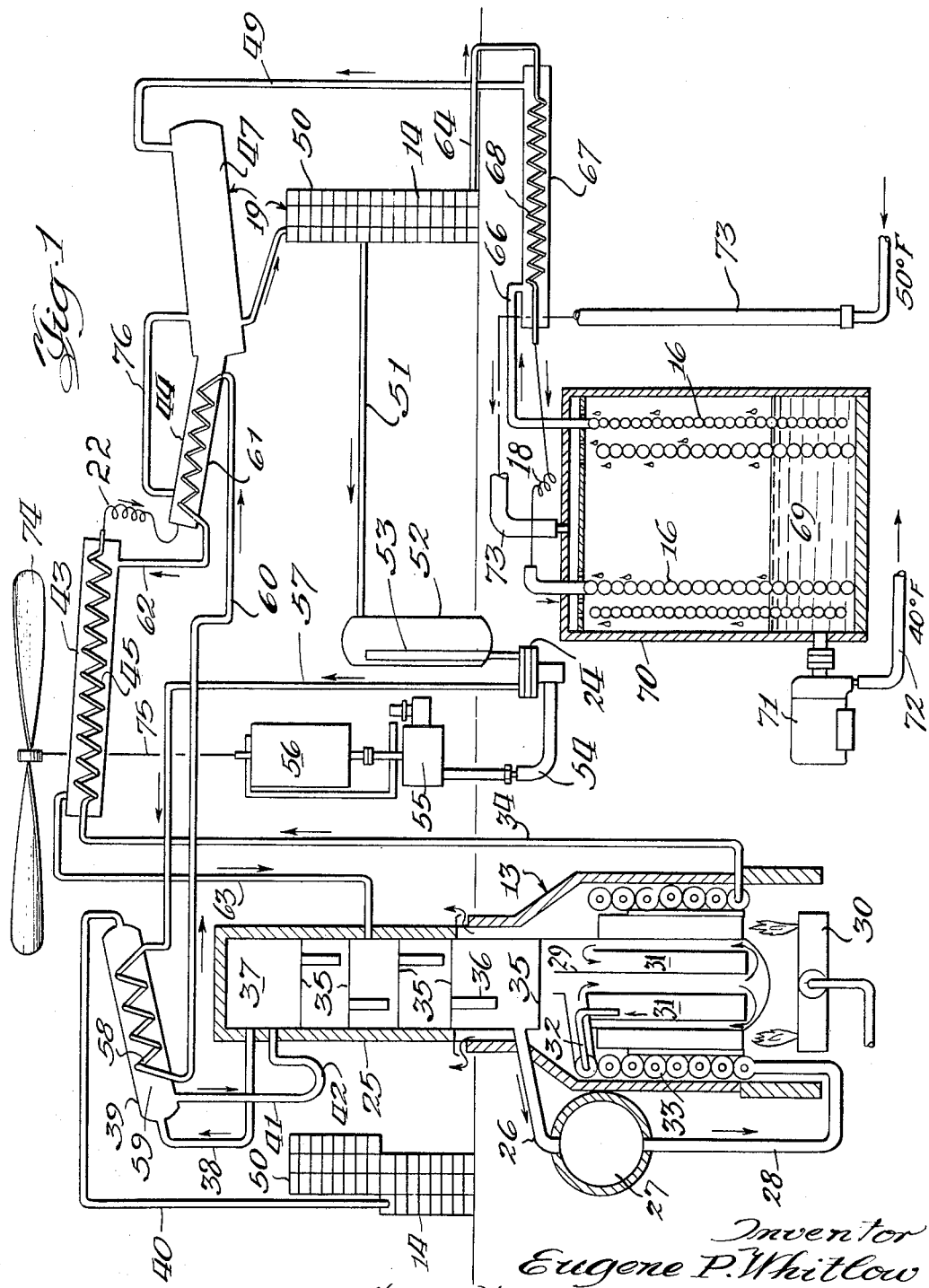
Inventor
Eugene P. Whitlow
By Hofgren, Wegner, Allen, Stellman & McCord
Attorneys

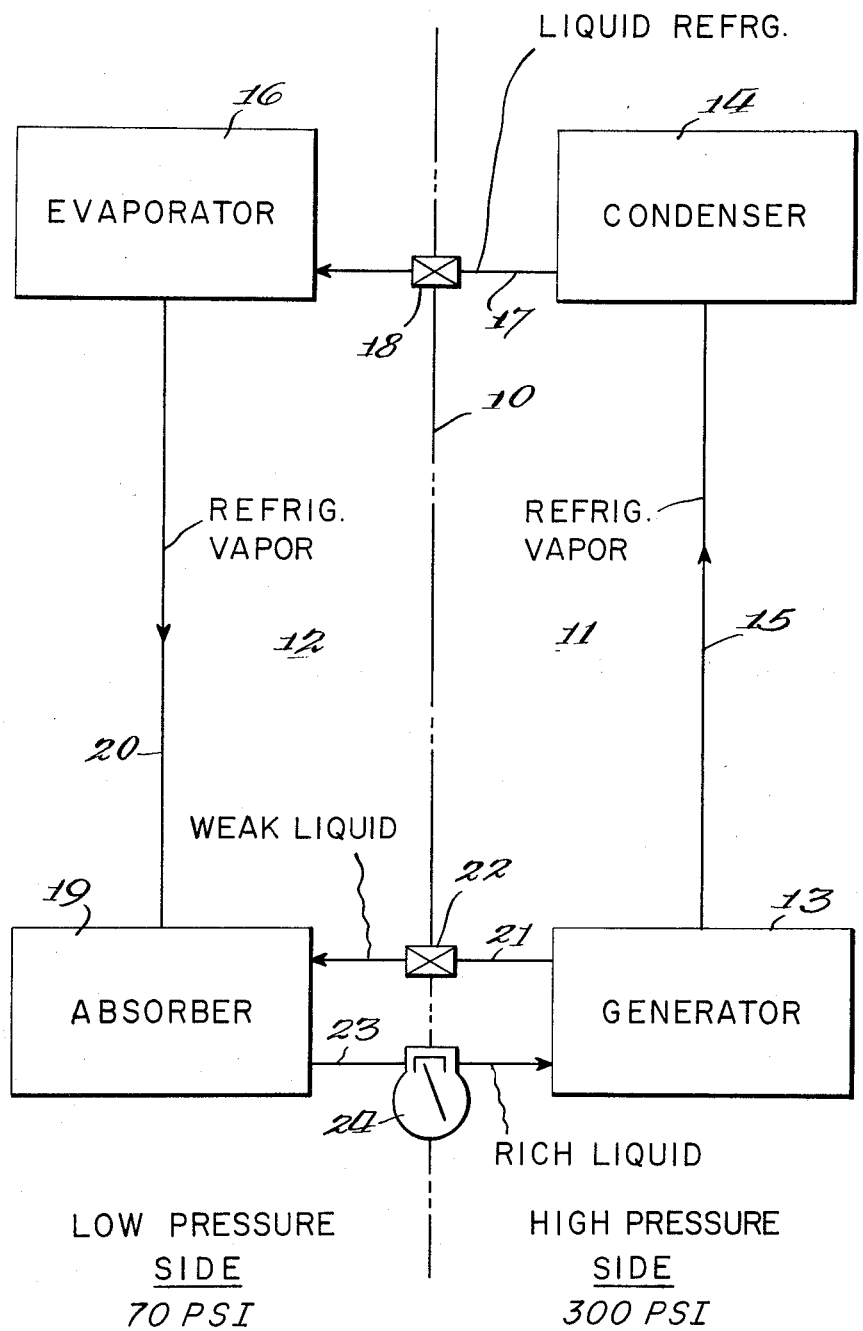

United States Patent Office 3,236,064
Patented Feb. 22, 1966

3,236,064
ABSORPTION REFRIGERATION SYSTEM
Eugene P. Whitlow, St. Joseph, Mich., assignor to Whirlpool Corporation, a corporation of Delaware
Filed May 26, 1964, Ser. No. 370,327
8 Claims. (Cl. 62—476)

This invention relates to an absorption refrigeration system particularly of the two pressure type having a low pressure side and a high pressure side and pressure imparting means therebetween.

The present invention is concerned with an absorption refrigeration system in which a refrigerant such as ammonia which may be either gaseous or liquid depending upon the conditions within the system and an absorption liquid which may be water combine to form a solution with the ammonia refrigerant. In such a system, a heated generator is used to drive off gaseous refrigerant from a solution of the refrigerant in the absorption liquid and this solution as it enters the generator is a rich liquid as it contains a high concentration of refrigerant as compared to liquid leaving the generator, for example, which is identified as weak liquid.

As in the customary system the refrigerant gas so generated is then conveyed to a condenser in order to convert it to liquid refrigerant which is then conveyed to an evaporator in which evaporation occurs to produce the cooling effect. Rich liquid is then again generated in the cycle by contacting the gaseous refrigerant with the weak liquid from the generator in an absorber so that the resulting rich liquid can again be passed through the generator to again generate gaseous refrigerant.

One of the features of the present invention is to provide an improved absorption refrigeration system that is ideally suited for use in air conditioning systems in that the efficiency of its operating parts permits the system being produced in small sizes.

Other features and advantages of the invention will be apparent from the following description of one embodiment thereof taken in conjunction with the accompanying drawings. Of the drawings:

FIGURE 1 is a semi-diagrammatic view of an absorption refrigeration system embodying the invention.

FIGURE 2 is a simplified flow diagram showing the relationship of the parts of the system to the high pressure side and the low pressure side.

FIGURE 2 illustrates the general arrangement of a typical two pressure absorption refrigeration system. The central broken line 10 divides the circuit into the high pressure side 11 and the low pressure side 12. As is shown, the generator 13 and condenser 14 are on the high pressure side which may be operated, for example, at about 300 p.s.i. The generator is connected to the condenser by a line 15 for conveying refrigerant vapor generated in the generator to the condenser where it is condensed to liquid refrigerant.

The condenser is connected to the evaporator 16 by a line 17 for conveying liquid refrigerant to the evaporator where evaporation takes place to produce the cooling effect. In the line 17 is a flow restrictor means 18 which may be in the form of a usual capillary because the condenser end of the line 17 is on the high pressure side and the evaporator end is on the low pressure side.

Gaseous refrigerant produced in the evaporator 16 by evaporation is conveyed to an absorber 19 by means of a refrigerant vapor line 20. In the absorber 19 the refrigerant vapor is contacted with weak liquid from the generator 13 to produce rich liquid. The weak liquid is supplied from the generator through a line 21 also containing a flow restrictor means 22 similar to the means 18 because the generator is on the high pressure side and the absorber 19 on the low pressure side. Rich liquid from the absorber flows to the generator through a line 23 and in the generator gaseous refrigerant is again driven off to start the cycle over again. The line 23 contains a pressure imparting diaphragm pump 24 which transfers the rich liquid for the low pressure side of the system to the high pressure side of the system.

A more detailed showing of the arrangement of parts in the system of this invention is illustrated in FIGURE 1 Certain parts of this system as illustrated are shown in greater detail and claimed in copending applications assigned to the same assignee as is the present application. Thus, the generator 13 is disclosed and claimed in my copending application Ser. No. 370,902, filed May 28, 1964, while the absorber 19 is disclosed in detail and claimed in the copending application of Whitlow and Shimotake, Ser. No. 370,269, filed May 26, 1964.

As is customary in such refrigeration systems a rectifier 25 is employed, and this is shown in detail and claimed in my co-pending application Ser. No. 358,514, filed April 9, 1964.

Rich liquid is supplied to the generator 13 from the bottom of the rectifier 25 by a pipe 26 leading to a receiver 27 and from there to the generator through a pipe 28. From the pipe 28 the rich liquid flows down a central tube 29 in the generator to the bottom thereof and this rich liquid is heated as explained in the above copending application by a burner 30. The liquid flow in the generator is indicated by the arrows therein and by the time the liquid reaches the inner annular space 31 the dissolved refrigerant has been mainly driven off so that the liquid in the space 31 is now weak liquid. This weak liquid is drawn off through a pipe 32 from the space 31 and flows from the top of the generator to the bottom, countercurrent to the incoming rich liquid. This arrangement is explained in more detail in my above copending application but, in general, the weak liquid pipe 32 is within and coaxial of the helical rich liquid conduit 33. The resulting weak liquid is then conveyed out of the generator 13 by a pipe 34.

The gaseous refrigerant that is driven off in the generator 13 passes upwardly through the rectifier 25 in which it passes through a series of perforated plates 35. In the rectifier the gaseous refrigerant is in contact with downflowing rich liquid in the usual manner which passes from plate to plate in descending order through pipes 36. In the rectifier the passage upwardly therethrough of the gaseous refrigerant serves to remove water vapor from the refrigerant.

The gaseous refrigerant from the top 37 of the rectifier then is directed through a pipe 38 to heat exchanger 39. In this heat exchanger more moisture is condensed from the refrigerant vapor so that this vapor after it passes from the exchanger 39 through the pipe 40 to the condenser 14 is very dry.

The generator 13 and rectifier 25 which are separately disclosed and claimed in two of the above-identified applications as indicated produce weak liquid with a very low concentration of dissolved ammonia such as about 5% and a very dry refrigerant that is condensed in the condenser 14.

Moisture condensed in the heat exchanger 39 forms a rich liquid by dissolving some of the gaseous refrigerant and this rich liquid is supplied to the top rectifier space 37 by way of a pipe 41 containing a liquid trap 42.

The weak liquid pipe from the generator 13 conveys the weak liquid to a first heat exchanger 43 which is employed in conjunction with a second heat exchanger 44 which forms a part of the absorber 19. The weak liquid pipe 34 is connected to a helical inner pipe 45 within the first exchanger 43 and this helix 45 is connected to the capillary flow restrictor 22 which itself is then connected to the second exchanger 44. Both the exchangers 43 and 44 are at angles to the horizontal and the lower end of exchanger 44 communicates with the lower end of a sloped container 47 forming another part of the absorber 19.

In the absorber 19 the weak liquid supplied through the capillary 22 is contacted with gaseous refrigerant through a line 49 and this mixture of liquid and refrigerant then flows through the rest of the absorber which is in the form of stacked coils 50 as described in the above copending application Ser. No. 370,269.

After the liquid has passed through the absorber 19 it becomes rich liquid because of the absorbed refrigerant. This rich liquid is then conveyed through a line 51 to a receiver 52 where it passes through a cylindrical screen 53 to remove foreign particles and then to the pump 24.

The pump 24 is a diaphragm pump which is operated by hydraulic fluid supplied from hydraulic pump 55 through conduit 54. Hydraulic pump 55 is operated by an electric motor 56.

From the pump 24 the rich liquid is directed through a line 57 to the heat exchanger 39. In the heat exchanger 39 the rich liquid passes through a helical pipe 58 which is surrounded by gaseous refrigerant in the interior space 59, as the rich liquid is cool when it leaves the absorber 19 the contact of the gaseous refrigerant with the helix 58 in the space 59 serves further to cool the gaseous refrigerant before it passes to the condenser 14 and to aid further in condensing moisture from the refrigerant in the space 59. Thus, the gaseous refrigerant in the heat exchanger 39 may be cooled by either or both of two cooling means. One of these is the cool rich liquid in the coil 58 and the other is the surrounding air. Because it removes moisture from the gaseous refrigerant, the exchanger 39 therefore functions as an extension or addition to the rectifier 25.

From the heat exchanger coil 58 the rich liquid is conveyed through a line 60 to a helical line 61 within the second exchanger 44 of the pair of heat exchangers 43-44. From this helix 61 the rich liquid is then conveyed by a line 62 to the interior of the first heat exchanger 43.

From the exchanger 43 the rich liquid is directed through a line 63 to a rectifier 25 at a point intermediate the top and bottom thereof. Thus rich liquid from the lines 41 and 63 combine in the rectifier 25 for contact with the freshly driven off gaseous refrigerant from the generator 13. From the bottom of the rectifier as previously described the rich liquid then flows back through the receiver 27 to the generator 13.

As previously described, dry gaseous refrigerant passes through the pipe 40 to the condenser 14 where it is condensed into liquid refrigerant. From the condenser 14 the liquid refrigerant is conveyed through a line 64 and the capillary flow restrictor 17 to the evaporator 16.

The evaporator 16 is in the form of two concentric and parallel helical turns of pipe in which the liquid refrigerant evaporates to produce a cooling effect. From the evaporator 16 gaseous refrigerant flows out through a pipe 66 to a heat exchanger 67 which contains a helix 68 that is a part of the liquid refrigerant line 64. Thus the liquid refrigerant flowing from the condenser 14 to the evaporator 16 is passed in heat exchange relationship with the gaseous refrigerant from the evaporator 16. The gaseous refrigerant from the heat exchanger 67 is then directed as previously described through the line 49 to the absorber 19.

Helical evaporator 16 has its upper portion flooded with a liquid 69 and has its lower portion immersed in liquid 69. This liquid 69 is held in a tank 70 and may be water containing an antifreeze substance of the usual well known type.

In order to produce cooling in the room, such as the rooms of a house, a motor driven pump 71 is provided to withdraw chilled solution from the bottom of the tank 70 and pump it through a pipe 72 to heat exchangers (not shown) arranged as desired in the space to be cooled. In a typical installation solution from the pump 71 is at about 40° F. Return solution flows into the tank 70 by a return pipe 73 which empties into the tank 70 at the top thereof. In a typical installation the solution leaving the container on its way to the heat exchanger was about 40° F. while the solution returned to the tank was about 50° F.

In order to cool the parts of the refrigeration system there is provided a blower identified diagrammatically at 74 and also driven by the motor 56 as indicated by the broken line 75.

As pointed out above, the heat exchanger 39 condenses moisture from the gaseous refrigerant so that only dry refrigerant is supplied to the condenser 14. The efficiency of the system is also improved by utilizing the pair of heat exchangers 43 and 44 each having a rich liquid portion and a weak liquid portion with the weak liquid portion in the second exchanger 44 surrounding the rich liquid helix 61 so that it not only provides for cooling of the rich liquid but also provides surface contact with gaseous refrigerant within the absorber in order that the gaseous refrigerant will be absorbed. In the first heat exchanger 43 of this pair the weak liquid is in the helical pipe 45 where it is surrounded by cool rich liquid to provide a maximum cooling effect. The pair of heat exchangers 43 and 44 contribute to cooling the weak liquid to a temperature corresponding to the vapor pressure within the absorbing means 19 of which the second heat exchanger 44 forms an important part. This arrangement of the second heat exchanger 44 in which the weak liquid is exposed to gaseous refrigerant permits flowing the weak liquid and refrigerant countercurrently to each other. Thus, in the disclosed embodiment weak liquid from the capillary 22 flows down the sloped heat exchanger 44 while gaseous refrigerant supplied through the pipe 49 flows up the sloped heat exchanger 44. In order to equalize pressure in the two parts 44 and 47 of this portion of the absorber there is provided a pipe 76 through which gas can flow.

Having described my invention as related to the embodiment shown in the accompanying drawings, it is my intention that the invention be not limited by any of the details of description, unless otherwise specified, but rather be construed broadly with its spirit and scope as set out in the accompanying claims.

I claim:

1. In an absorption refrigeration system charged with refrigerant and absorption liquid, apparatus comprising: a heated generator means for generating gaseous refrigerant from a rich liquid comprising said refrigerant and absorption liquid; a heat exchanger having a gaseous refrigerant passage and a rich liquid passage; a condenser for converting gaseous refrigerant to liquid refrigerant; means for passing said gaseous refrigerant through its said passage of said heat exchanger to said condenser; means for passing said rich liquid through its said passage of said heat exchanger to said generator whereby said rich liquid is preheated by said gaseous refrigerant prior to entering said generator and said gaseous refrigerant is cooled to condense moisture therefrom prior to entering said condenser; and auxiliary means for cooling said gaseous refrigerant portion of said heat exchanger to aid further in said moisture condensing.

2. The apparatus of claim 1 wherein said auxiliary means comprises air cooling means for said gaseous refrigerant passage.

3. In an absorption refrigeration system charged with refrigerant and absorption liquid, apparatus comprising: a heated generator means for generating gaseous refrigerant from a rich liquid comprising said refrigerant and absorption liquid; a rectifier for flowing said gaseous refrigerant from said generator in contact with rich liquid to said generator; a heat exchanger having a gaseous refrigerant passage and a rich liquid passage; a condenser for converting gaseous refrigerant to liquid refrigerant; means for passing said gaseous refrigerant through its said passage of said heat exchanger to said condenser subsequent to its flow through said rectifier; means for passing said rich liquid through its said passage of said heat exchanger to said generator whereby said rich liquid is preheated by said gaseous refrigerant prior to entering said generator and said gaseous refrigerant is cooled to condense moisture therefrom prior to entering said condenser; auxiliary air cooling means for cooling said gaseous refrigerant passage of said heat exchanger to aid further in said moisture condensing; and means for conveying said condensed moisture to said rectifier.

4. In an absorption refrigeration system charged with refrigerant and absorption liquid, apparatus comprising: a heated generator means for generating gaseous refrigerant from a liquid comprising said refrigerant and absorption liquid and producing a resulting weak liquid; a pair of heat exchangers each having a rich liquid passage and a weak liquid passage; means for directing said liquid to said generator through said pair of rich liquid heat exchanger passages in series; absorbing means; and means for directing said weak liquid from said generator through said pair of weak liquid heat exchanger passages in series, one of said weak liquid heat exchanger passages comprising part of said absorbing means and containing gaseous refrigerant in absorbing contact with said weak liquid.

5. In an absorption refrigeration system charged with refrigerant and absorption liquid, apparatus comprising: a heated generator means for generating gaseous refrigerant from a rich liquid comprising said refrigerant and absorption liquid and producing a resulting weak liquid; a heat exchanger having a gaseous refrigerant passage and a rich liquid passage; a condenser for converting gaseous refrigerant to liquid refrigerant; means for passing said gaseous refrigerant through its said passage of said heat exchanger to said condenser; means for passing said rich liquid through its said passage of said heat exchanger to said generator whereby said rich liquid is preheated by said gaseous refrigerant prior to entering said generator and said gaseous refrigerant is cooled to condense moisture therefrom prior to entering said condenser; a pair of heat exchangers each having a rich liquid passage and a weak liquid passage; means for directing said rich liquid to said generator through said pair of rich liquid heat exchanger passages in series; absorbing means; and means for directing said weak liquid from said generator through said pair of weak liquid heat exchanger passages in series, one of said weak liquid heat exchanger passages comprising part of said absorbing means and containing gaseous refrigerant in absorbing contact with said weak liquid.

6. In an absorption refrigeration system charged with refrigerant and absorption liquid, apparatus comprising: a heated generator means for generating gaseous refrigerant from a rich liquid comprising said refrigerant and absorption liquid and producing a resulting weak liquid; a rectifier for flowing said gaseous refrigerant from said generator in contact with rich liquid to said generator; a heat exchanger having a gaseous refrigerant passage and a rich liquid passage; a condenser for converting gaseous refrigerant to liquid refrigerant; means for passing said gaseous refrigerant through its said passage of said heat exchanger to said condenser subsequent to its flow through said rectifier; means for passing said rich liquid through its said passage of said heat exchanger to said generator whereby said rich liquid is preheated by said gaseous refrigerant prior to entering said generator and said gaseous refrigerant is cooled to condense moisture therefrom prior to entering said condenser; auxiliary air cooling means for cooling said gaseous refrigerant passage of said heat exchanger to aid further in said moisture condensing; a pair of heat exchangers each having a rich liquid passage and a weak liquid passage; means for directing said rich liquid to said generator through said pair of rich liquid heat exchanger passages in series; absorbing means; and means for directing said weak liquid from said generator through said pair of weak liquid heat exchanger passages in series, one of said weak liquid heat exchanger passages comprising part of said absorbing means and containing gaseous refrigerant in absorbing contact with said weak liquid.

7. In an absorption refrigeration system charged with refrigerant and absorption liquid, apparatus comprising: a heated generator means for generating gaseous refrigerant from a rich liquid comprising said refrigerant and absorption liquid and producing a resulting weak liquid; absorbing means; and a pair of heat exchangers each having a rich liquid passage and a weak liquid passage, the weak liquid passage of a first one of said pair comprising a pipe and the corresponding rich liquid passage comprising a rich liquid conduit surrounding said weak liquid pipe, and the rich liquid passage of the second of said pair of heat exchangers comprising a pipe and the corresponding weak liquid passage comprising a weak liquid conduit surrounding said rich liquid pipe, said weak liquid conduit that surrounds said rich liquid pipe comprising a part of said absorbing means and containing gaseous refrigerant in absorbing contact with weak liquid therein, whereby the pair of heat exchangers contribute to cooling the weak liquid to a temperature corresponding to the vapor pressure within the absorbing means.

8. In a two pressure absorption refrigeration system charged with refrigerant and absorption liquid, and having a low pressure side and a high pressure side, apparatus comprising: a heated generator for generating gaseous refrigerant from a rich liquid comprising said refrigerant and absorption liquid and producing a resulting weak liquid; a pair of heat exchangers each having a rich liquid passage and a weak liquid passage, the weak liquid passage of a first one of said pair comprising a pipe and the corresponding rich liquid passage comprising a rich liquid conduit surrounding said weak liquid pipe, and the rich liquid passage of the second of said pair comprising a pipe and the corresponding weak liquid passage comprising a weak liquid conduit surrounding said rich liquid pipe; absorbing means; a flow restrictor between said weak liquid pipe of said first heat exchanger and said weak liquid conduit of said second heat exchanger, said weak liquid conduit that surrounds said rich liquid pipe comprising a part of said absorbing means and containing gaseous refrigerant in absorbing contact with weak liquid therein, whereby the pair of heat exchangers contribute to cooling the weak liquid to a temperature corresponding to the vapor pressure within the absorbing means, said absorbing means being on the low pressure side of said system and said generator being on the high pressure side; and means for flowing gaseous refrigerant and weak liquid countercurrently in said part of said absorbing means.

References Cited by the Examiner
UNITED STATES PATENTS

| | | | |
|---|---|---|---|
| 1,960,809 | 5/1934 | Dahlgren | 62—489 |
| 2,251,314 | 8/1941 | Ashby | 62—487 |
| 2,284,691 | 6/1942 | Strandberg | 62—489 |
| 2,392,894 | 1/1946 | Zwickl | 62—141 |

ROBERT A. O'LEARY, *Primary Examiner.*